United States Patent [19]
Davis, Jr.

[11] 3,756,207
[45] Sept. 4, 1973

[54] PUSHROD INCLOSURE

[76] Inventor: George B. Davis, Jr., 7512 Marbury Rd., Bethesda, Md. 20014

[22] Filed: May 1, 1972

[21] Appl. No.: 249,255

[52] U.S. Cl............................. 123/90.38, 184/6.9
[51] Int. Cl............................................ F01m 9/10
[58] Field of Search.................... 123/90.38; 184/6.9

[56] References Cited
UNITED STATES PATENTS
1,718,490   6/1929   Ryder .............................. 123/90.38
2,020,621   11/1935   Snyder ............................. 123/90.38

Primary Examiner—Al Lawrence Smith

[57] ABSTRACT

A pushrod inclosure that extends between the head and block of an internal combustion engine and serves to individually inclose each of the pushrods that operate the valves of the engine by rotation of the cam shaft. The inclosure includes a pair of telescoping members bearing against each other at at least two axially displaced locations with spring means enclosed between the members and between said bearing surfaces to urge the members in opposite directions while compressing a gasket disposed between the members.

4 Claims, 4 Drawing Figures

PATENTED SEP 4 1973 3,756,207
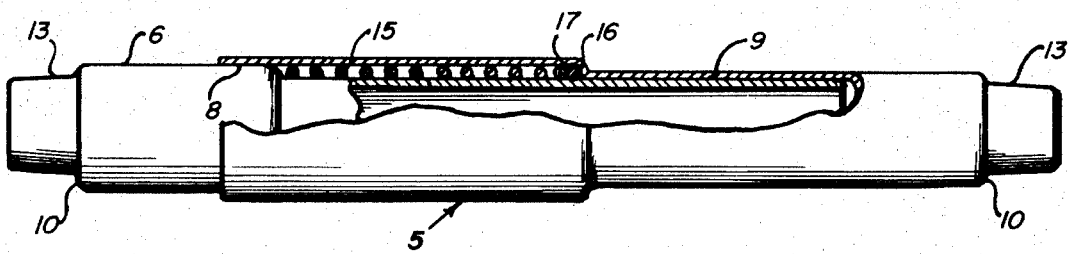
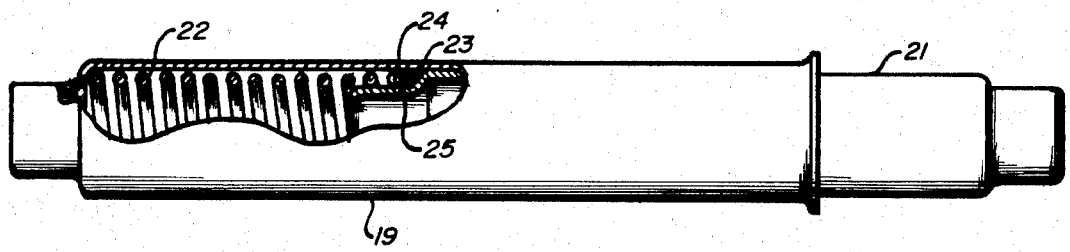
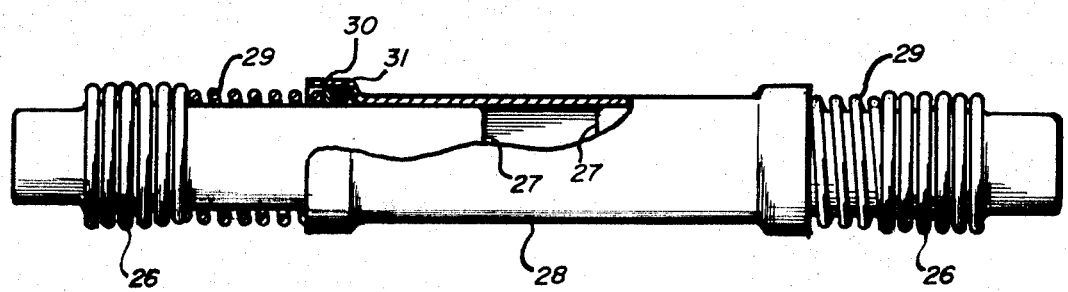
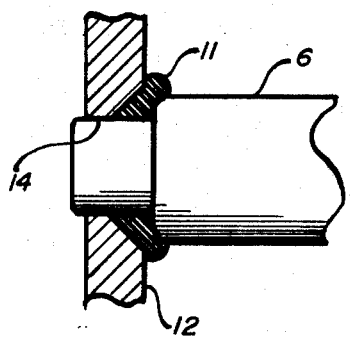

PUSHROD INCLOSURE

While this invention relates generally to pushrod inclosures, it pertains particularly to a pushrod inclosure of the telescoping type which, by reason of its unique structure, may be hand installed within an engine without the usual procedure of removing the cylinder head or the use of special tools as is generally required when installing or replacing pushrod inclosures of this type.

In addition to the ease of installation, the structure of the device is such as to maintain a continuous pressure upon all gasket seals used in the device and between the device and the head and block of the engine and by this application of constant pressure upon the oil retaining seals prevents the most common cause of pushrod inclosure failure by oil leakage from these sealing surfaces resulting from high temperature changes and constant vibration occurring during engine operation.

It is an object of the present invention to provide a new and improved pushrod inclosure that will telescope into place between the head and block of an internal combustion engine and yieldably retain itself in position without removal of the engine head and while maintaining all oil sealing gaskets pertaining thereto under constant pressure thusly preventing oil leakage by these sealing surfaces regardless of long exposure to engine vibration and extreme temperature changes.

A further object is to provide a pushrod inclosure of the type disclosed that, while being rugged in structure and efficient in operation, is relatively cheap to manufacture and adaptable to most engine application.

A better understanding of the device and its advantages may be had by referring now to the accompanying drawing wherein:

FIG. 1 is a view partly in elevation and partly cut away and showing the arrangement and relation of the various parts thereof.

FIG. 2 is a variation of the invention as shown partly in elevation and partly cut away.

FIG. 3 is an alternate form of the invention as shown incorporating a portion of a conventional pushrod inclosure.

FIG. 4 is a sectional, fragmentary view of a head or block as shown with the invention mounted therein.

Referring now to the drawing and more particularly to FIG. 1 thereof, wherein is shown a form of the invention as will be generally designated 5. The device 5 includes two closely fitting telescoping sections 6 and 7 with the bearing surfaces 8 and 9 therebetween so widely spaced as to provide a rugged smooth operating structure. Each of these sections 6 and 7 are so flanged at 10 as to compress, when mounted in an engine, ring gaskets 11 normally interposed between these flanges and the head and block 12 of the engine, FIG. 4. The extending end portions of the sections are necked down as at 13 to be received within guide surfaces 14 formed within the block and head. It will be noted that the surfaces 13 are somewhat tapered to provide for misalignment of these surfaces 14 formed in the block and head should such exist.

Interposed between the sections 6 and 7 is a spring member 15 so arranged and of a sufficient length that when compressed by assembly of the device within an engine, the gasket 16 between the sections and the end gaskets 11 between the device and the head and engine block are maintained under constant compression and whereby oil leakage by these surfaces is prevented regardless of the change in the gasket material that normally occur due to heat and vibratory conditions. Oil leaking by these gasket surfaces is the primary cause of pushrod inclosure failure and which generally requires an engine pulldown to repair. A washer 17 interposed between the spring and gasket provides a uniform spring pressure upon the gasket 16 and possible damage thereto from spring vibration.

In mounting the device as shown and after the rocker arm assembly and pushrod has been removed, one end of the assembly with gasket 11 in place is positioned within the receiving opening 14 within the block 12. The device is then compressed against the spring 15 sufficiently to allow the other end of the assembly to extend into sealing position within the head as the telescoping force upon the device is released. The device will thereafter yieldably maintain itself in position and in oil sealing relation with its mating parts regardless of the deteriating effects of time, temperature and vibration upon the sealing members.

FIG. 2 is a variation of the device wherein the spring is shown as inclosed within the section 19. The structure of the device of FIG. 2 differs somewhat from that of FIG. 1 in that the single bearing surface between the sections 19 and 21 is somewhat longer and thusly to provide a possibly more rigged structure. The spring 22 in addition to elongating the assembly for mounting within an engine, further provides for compressing the internal sealing member 23.

The washer 24 is interposed between the spring 22 and gasket 23 for the same purpose as in FIG. 1. The section 21 in this device is so formed at 25 as to confine and retain washer and gasket 24 and 23 respectively in their proper sealing relation between the two telescoping section of the device.

FIG. 3 is a relatively cheap and simple variation of the invention wherein the old pushrod inclosure forms a portion of the assembly. Here, after an approximately ¾ inch center section of the old pushrod inclosure has been removed as at 27, the closely fitting tubular member 28 is then telescoped over these sections 26 after first mounting thereover springs 29, washers 30 and gaskets 31 as shown. The arrangement provides for a telescoping pushrod inclosure wherein in use all oil seals are maintained under constant compression while allowing for hand assembly within an engine without removal of the engine head as previously required.

While three variations of the device are herein shown, it will be readily understood that various other arrangements and modifications may be resorted to without departing from the spirit and scope of the invention as herein claimed.

What I therefore claim and desire to cover by Letters Patent is:

1. A pushrod inclosure of the tubular telescoping type for extending between the block and head of an internal combustion engine to individually enclose each of the pushrods that operate the valves of the engine and including in combination, a pair of telescoping members, an outer telescoping member and an inner telescoping member movable with respect to each other upon a common longitudinal axis, said telescoping members having bearing surfaces bearing against each other at at least two axially displaced locations, gasket means disposed in oil sealing relation between said telescoping members and spring means telescopically enclosed between said telescoping members and disposed between said axially displaced bearing surface locations and engaging the outer telescoping member at one end and the inner telescoping member at the other end for urging said members in opposite directions along said axis to elongate said inclosure while compressing said gasket means.

2. A pushrod inclosure as claimed in claim 1 wherein external flanges are disposed in predetermined spaced relation inwardly from the outer ends of said inclosure.

3. A pushrod inclosure as claimed in claim 2 wherein outwardly from said flanges the ends of the inclosure diminishes gradually in diameter.

4. A pushrod inclosure as claimed in claim 1 wherein the ends of said inclosure are reduced in diameter to receive thereover annular gaskets.

* * * * *